(12) United States Patent
Ekström et al.

(10) Patent No.: US 11,834,116 B2
(45) Date of Patent: Dec. 5, 2023

(54) VEHICLE STEERING NON-UNIFORMITY COMPENSATION

(71) Applicant: Volvo Car Corporation, Gothenburg (SE)

(72) Inventors: Kenneth Ekström, Gothenburg (SE); Carl-Johan Häll, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 53 days.

(21) Appl. No.: 17/540,513

(22) Filed: Dec. 2, 2021

(65) Prior Publication Data
US 2023/0174148 A1 Jun. 8, 2023

(51) Int. Cl.
*B62D 5/04* (2006.01)
*B62D 1/181* (2006.01)
*B62D 6/10* (2006.01)
*B62D 15/02* (2006.01)
*B62D 6/00* (2006.01)
*B62D 5/00* (2006.01)

(52) U.S. Cl.
CPC ............. *B62D 6/008* (2013.01); *B62D 5/006* (2013.01)

(58) Field of Classification Search
None
See application file for complete search history.

(56) References Cited

U.S. PATENT DOCUMENTS

| 9,108,669 B2 | 8/2015 | Bean et al. |
| 9,889,876 B2 | 2/2018 | Russell et al. |
| 10,377,411 B2 | 8/2019 | Aoki |
| 10,457,323 B2 | 10/2019 | Rohrmoser |

(Continued)

FOREIGN PATENT DOCUMENTS

| CN | 105564527 B | 5/2016 |
| CN | 110588767 A | 12/2019 |
| DE | 102018107301 A1 | 10/2018 |

OTHER PUBLICATIONS

Lee, D. et al. | "Robust steering-assist torque control of electric-power-assisted-steering systems for target steering wheel torque tracking". Mechatronics 49 (2018) 157-167, 11 pages.

(Continued)

*Primary Examiner* — Adam D Tissot
*Assistant Examiner* — Laura E Linhardt
(74) *Attorney, Agent, or Firm* — Amin, Turocy & Watson, LLP

(57) ABSTRACT

Machine-learning-based steering torque non-uniformity compensation for vehicles is enabled. For example, a system can comprise a memory that stores computer executable components, and a processor that executes the computer executable components stored in the memory, wherein the computer executable components comprise: a machine learning component that generates a steering non-uniformity model based on machine learning applied to past steering data representative of positions and steering ratios of a steering wheel of a vehicle, and a torque compensation component that, using current position data representative of a current position of the steering wheel and the steering non-uniformity model, determines a torque to apply to the steering wheel configured to offset a steering non-uniformity at the current position.

20 Claims, 10 Drawing Sheets

(56) References Cited

U.S. PATENT DOCUMENTS

| | | |
|---|---|---|
| 10,814,907 B2 | 10/2020 | Naik et al. |
| 10,988,169 B2 | 4/2021 | Moreillon et al. |
| 2014/0303848 A1* | 10/2014 | Bean .................. B62D 5/0472 |
| | | 701/41 |
| 2018/0281844 A1* | 10/2018 | Wijffels ................ B62D 6/002 |
| 2018/0297594 A1* | 10/2018 | Takahashi ............ B60W 10/04 |
| 2020/0290646 A1 | 9/2020 | Safour et al. |

OTHER PUBLICATIONS

Extended EP Search Report for EP Application No. 22211119.7 dated Apr. 17, 2023.

\* cited by examiner

VEHICLE STEERING NON-UNIFORMITY COMPENSATION

TECHNICAL FIELD

The disclosed subject matter relates to vehicle steering systems, more particularly, to machine-learning-based steering torque non-uniformity compensation for vehicles (e.g., passenger automobiles).

BACKGROUND

Vehicle steering columns typically utilize one or more universal joints. The universal joints (u-joints) cause angular speed non-uniformities between steering wheels and steering boxes or racks, which lead to torque non-uniformities observed at a steering wheel. The foregoing occurs due to different angles and corresponding phase associated with rotation of universal joints. Additionally, steering wheel designs including locations of a steering wheel airbags, spokes, stalks, paddle shifters, user accessories, or buttons/controls often lead to an offset in a center of gravity position from a center axis of the steering wheel, which can also lead to a torque non uniformity observed at a steering wheel. Such torque non-uniformity is undesirable, as it causes a non-linear, indirect steering feel.

The above-described background relating to steering torque non-uniformity compensation is merely intended to provide a contextual overview of some current issues and is not intended to be exhaustive. Other contextual information may become further apparent upon review of the following detailed description.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate steering torque non-uniformity compensation.

As alluded to above, steering torque non-uniformity compensation can be improved in various ways, and various embodiments are described herein to this end and/or other ends.

According to an embodiment, a system can comprise a memory that stores computer executable components, and a processor that executes the computer executable components stored in the memory, wherein the computer executable components can comprise: a machine learning component that generates a steering non-uniformity model based on machine learning applied to past steering data representative of positions and steering ratios of a steering wheel of a vehicle, and a torque compensation component that, using current position data representative of a current position of the steering wheel and the steering non-uniformity model, determines a torque to apply to the steering wheel configured to offset a steering non-uniformity at the current position.

According to another embodiment, a non-transitory machine-readable medium can comprise executable instructions that, when executed by a processor, facilitate performance of operations, comprising: generating a steering non-uniformity model based on machine learning applied to past steering data representative of positions and steering ratios of a steering wheel of a vehicle, and using current position data representative of a current position of the steering wheel and the steering non-uniformity model, determining a torque to apply to the steering wheel configured to offset a steering non-uniformity at the current position.

According to yet another embodiment, a method can comprise: generating, by a device comprising a processor, a steering non-uniformity model based on machine learning applied to past steering data representative of positions and steering ratios of a steering wheel of a vehicle, and using current position data representative of a current position of the steering wheel and the steering non-uniformity model, determining, by the device, a torque to apply to the steering wheel configured to offset a steering non-uniformity at the current position.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments the described herein.

Figure 1:
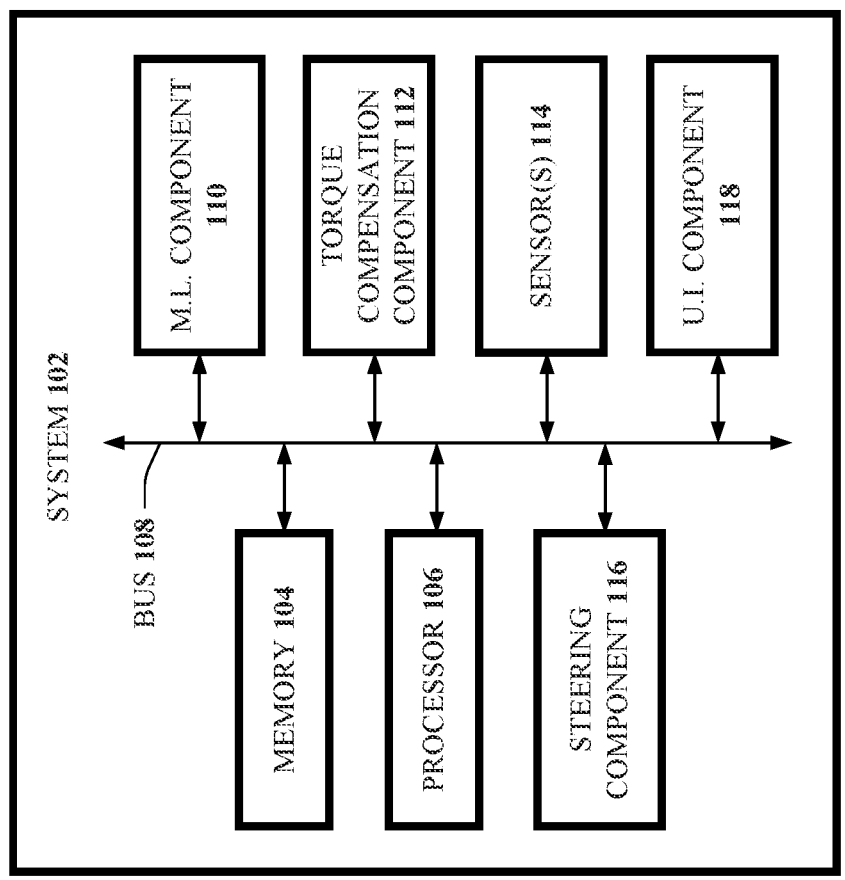
FIG. 1 illustrates a block diagram of an exemplary system in accordance with one or more embodiments described herein.

Turning now to FIG. 1, there is illustrated an example, non-limiting system 102 in accordance with one or more embodiments herein. System 102 can comprise a computerized tool, which can be configured to perform various operations relating to steering torque non-uniformity compensation. The system 102 can comprise one or more of a variety of components, such as memory 104, processor 106, bus 108, machine learning (M.L.) component 110, torque compensation component 112, one or more of a sensor 114, steering component 116, and/or a user interface (U.I.) component 118.

In various embodiments, one or more of the memory 104, processor 106, bus 108, M.L. component 110, torque compensation component 112, sensor 114, steering component 116, and/or U.I. component 118 can be communicatively or operably coupled (e.g., over a bus or wireless network) to one another to perform one or more functions of the system 102.

It is noted that the steering component 116 can comprise one or more of a variety of steering components, such as a steering wheel (or a steering yoke or another suitable vehicle steering apparatus), steering column, steering rack, steering box/gearbox, hydraulic power steering pump, electro-hydraulic power steering pump, electronic power steering motor in a drive by wire steering system, electronic power assisted steering (EPAS), an adjustable mass (e.g., received in or on a steering wheel), an actuator (e.g., of a steering wheel or a steering motor/box), or another suitable steering component. Likewise, the sensor 114 can comprise one or more of a variety of sensors, such as a steering column position sensor, a steering wheel angle sensor (e.g., relative angle or rotational angle), a steering wheel position sensor (e.g., telescopic position or tilt position), a sensor of a steer by wire system, a sensor of an EPAS motor, a sensor of a steering wheel actuator motor, or another suitable sensor. In an embodiment, the sensor 114 can comprise a position sensor that determines positions of a steering wheel of a vehicle and/or steering ratios (e.g., ratio between the driver input at the steering wheel and the change in steering angle at the wheels (e.g., tires) of the vehicle). It is noted that steering systems herein can comprise forward steering systems, rearward steering systems, or a combination or steering systems or orientations. It is further noted that embodiments herein can be implemented in one or more of a variety of vehicles, such as passengers cars, trucks, crossovers, or sport utility vehicles, commercial vehicles, autonomous vehicles, internal combustion vehicles, electric vehicles, hybrid vehicles, fuel cell vehicles, or other suitable vehicles. Such vehicles can comprise four-wheeled motor vehicles, or can additionally/alternatively comprise three-wheeled vehicles, two-wheeled vehicles, or even one-wheeled vehicles.

According to an embodiment, the M.L. component 110 can generate a steering non-uniformity model (e.g., a steering wheel model and/or a steering column model) based on machine learning applied to past steering data representative of positions and steering ratios of a steering wheel (and/or a steering column) of a vehicle. In various embodiments, the M.L. component can generate a non-uniformity model applicable to a variety of different vehicles or like-vehicles. In this regard, such models can be generalized to be universally applicable, or can be tailored to individual vehicles and associated steering systems. It is noted that the steering non-uniformity model can be configured to model a relationship between steering wheel/column angles, positions, and/or ratios of the vehicle and respective steering torques exhibited at the steering wheel or column. In an implementation, a steering wheel herein can comprise an adjustable steering wheel, and the past steering column data can be further representative of past adjusted positions (e.g., steering wheel angle/tilt, steering wheel extension/retraction of a telescoping steering wheel) of the steering wheel. It is additionally noted that steering ratios herein can vary during rotation of the steering wheel (e.g., due to rotational speeds and angles of u-joints in a steering system herein).

According to an embodiment, the torque compensation component 112 can, using current position data representative of a current position (e.g., determined using a sensor 114) of the steering wheel (or another component such as a steering column, steering box, or steering motor) and the steering non-uniformity model, determine a torque to apply to/via the steering component 116 (e.g., steering wheel or steering column, and/or steering motor or actuator) configured to offset (e.g., counteract) a steering non-uniformity at the current position (e.g., of the steering wheel or steering motor or actuator). In this regard, by offsetting the steering non-uniformity, a more linear, direct feel in the steering wheel can be enabled. In various embodiments, the vehicle can comprise electronic power assisted steering. In this regard, the torque can be applied via an electric motor of the EPAS. In additional embodiments, the vehicle can comprise drive by wire steering. In this regard, said torque can be applied via an electric feedback motor of the steering wheel (e.g., of the drive by wire steering system). In further embodiments, the torque can be applied via an actuator of an electrohydraulic power assisted steering system. It is noted that the M.L. component 110 can learn to compensate for steering non-uniformities in any of the foregoing steering system types, or other suitable steering system types. In additional embodiments, lookup tables for torque values herein can be utilized. Such lookup tables can be predefined, or determined using the machine learning described herein.

According to an embodiment, the steering component 116 can comprise a steering wheel, which can comprise therein an adjustable mass (e.g., internal, or external to said steering wheel). In this regard, the adjustable mass can be received in the steering wheel and can be configured to alter a center of mass of the steering wheel (e.g., when the adjustable mass is moved/adjusted). For example, by moving the adjustable mass relative to the steering wheel, the center of gravity of said steering wheel can be adjusted. The foregoing can be utilized to compensate, for instance, for a steering wheel in which the center of gravity does not threshold match the center axis of the steering wheel. Further in this regard, said steering wheel can comprise an actuator that, based on the torque (e.g., as determined by the M.L. component 110 and/or torque compensation component 112), moves the adjustable mass to adjust a moment of inertia and/or center of mass or gravity of the steering wheel to compensate for the center of gravity of the steering wheel not threshold corresponding to the center axis of the steering wheel. In some embodiments, the adjustable mass can be configured to bias a center of mass of the steering wheel to return (e.g., when not handled by a user) to a centered position (e.g., a position that would cause an associated vehicle to move straight forward or backward). In various implementations, the adjustable mass can be enabled in response to a determination (e.g., by the system 102) of a steering system or component failure. For example, the adjustable mass can be enabled in response to an EPAS motor or sensor failure, drive by wire wheel actuator motor failure, electrohydraulic motor or sensor failure, or another identifiable failure. In this regard, the adjustable mass can comprise a backup system to mitigate the effects of steering non-uniformities, however in additional embodiments, the adjustable mass can comprise a primary system.

According to an embodiment, the torque to apply herein (e.g., as determined by the M.L. component 110 and/or torque compensation component 112) can be further based on setting information representative of a driving mode setting. For example, such driving modes can correspond to one or more of a variety of steering modes or "feels" of a vehicle steering herein. Such steering modes can alter a level of steering power assist, steering feedback, steering ratios, steering weight or resistance, steering rebound force, or other suitable steering adjustments. In this regard, such a driving mode setting can be received via a U.I. component 118. Such a U.I. component 118 can comprise one or more of a screen of an associated vehicle, a button, knob, or switch of an associated vehicle, a voice command system of an associated vehicle, or another suitable U.I. component or system. In this regard, steering models herein can be further based on such driving mode settings, and the M.L. component 110 and/or torque compensation component 112 can adjust a level of torque to apply to counter steering non-uniformity based on the driving mode. In this regard, a level/amount of non-uniformity compensation (e.g., torque) can be increased or decreased depending on the driving or steering mode.

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (A.I.) model and/or M.L. or an M.L. model that can learn to perform the above or below described functions (e.g., via training using historical training data and/or feedback data).

In some embodiments, M.L. component 110 can comprise an A.I. and/or M.L. model that can be trained (e.g., via supervised and/or unsupervised techniques) to perform the above or below-described functions using historical training data comprising various context conditions that correspond to various vehicle steering non-uniformity compensation operations. In this example, such an A.I. and/or M.L. model can further learn (e.g., via supervised and/or unsupervised techniques) to perform the above or below-described functions using training data comprising feedback data, where such feedback data can be collected and/or stored (e.g., in memory) by the M.L. component 110. In this example, such feedback data can comprise the various instructions described above/below that can be input, for instance, to a system herein, over time in response to observed/stored context-based information.

A.I./M.L. components herein can initiate an operation(s) associated with a based on a defined level of confidence determined using information (e.g., feedback data). For example, based on learning to perform such functions described above using feedback data, performance information, and/or past performance information herein, an M.L. component 110 herein can initiate an operation associated with determining various thresholds herein (e.g., similarity thresholds between center of mass/gravity and steering wheel center axis, motion pattern thresholds, input pattern thresholds, similarity thresholds, authentication signal thresholds, audio frequency thresholds, or other suitable thresholds).

In an embodiment, the M.L. component 110 can perform a utility-based analysis that factors cost of initiating the above-described operations versus benefit. In this embodiment, the M.L. component 110 can use one or more additional context conditions to determine various thresholds herein.

To facilitate the above-described functions, a M.L. component 110 herein can perform classifications, correlations, inferences, and/or expressions associated with principles of artificial intelligence. For instance, the M.L. component 110 can employ an automatic classification system and/or an automatic classification. In one example, the M.L. component 110 can employ a probabilistic and/or statistical-based analysis (e.g., factoring into the analysis utilities and costs) to learn and/or generate inferences. The M.L. component 110 can employ any suitable machine-learning based techniques, statistical-based techniques and/or probabilistic-based techniques. For example, the M.L. component 110 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the M.L. component 110 can perform a set of machine-learning computations. For instance, the M.L. component 110 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

In various implementations, the system 102 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

Figure 2:
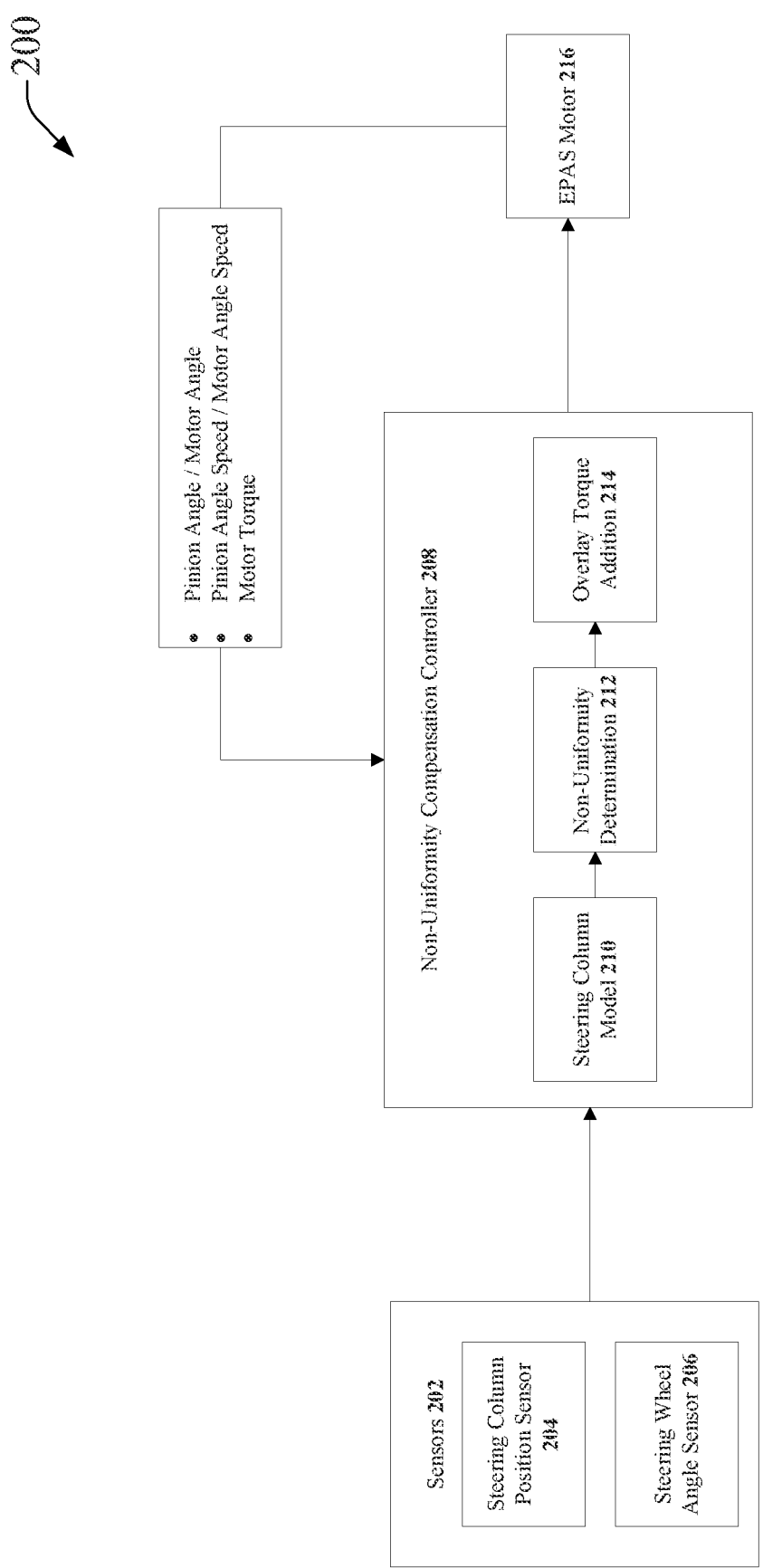
FIG. 2 illustrates a block diagram of an exemplary system in accordance with one or more embodiments described herein.

With reference to FIG. 2, there is illustrated an example, non-limiting system 200 in accordance with one or more embodiments herein. According to an embodiment, system 200 can be utilized with EPAS steering (e.g., via an EPAS motor 216). It is noted that system 200 can be similar to system 102. System 200 can comprise one or more of sensors 202 (e.g., steering column position sensor 204 and/or steering wheel angle sensor 206), a non-uniformity compensation controller 208, and/or an EPAS motor 216. It is noted that the non-uniformity compensation controller 208 can receive data from the sensors 202 and/or the EPAS motor 216. For example, the non-uniformity compensation controller 208 can receive steering column position data from the steering column position sensor 204 and steering wheel angle data from the steering wheel angle sensor 206. In various embodiments, the non-uniformity compensation controller 208 can additionally/alternatively receive pinion angle or motor angle data, pinion angle speed data or motor angle speed data, and/or motor torque data from the EPAS motor 216. In this regard, the non-uniformity compensation controller 208 can utilize a steering column model 210 (e.g., generated using machine learning herein) to generate a non-uniformity determination 212. Such a non-uniformity determination 212 can comprise a determination of a non-uniformity exhibited in a steering wheel at a given position and angle. Based on the non-uniformity determination 212, the non-uniformity compensation controller 208 can determine a torque addition 214 to apply via the EPAS motor 216. In this regard, the non-uniformity compensation controller 208 can cause the EPAS motor 216 to compensate for the determined non-uniformity at the given position and angle (e.g., by an appropriate amount of torque applied via the EPAS motor 216). It is noted that the non-uniformity compensation controller 208 can rapidly determine torque additions 214 so that steering uniformity is maintained in real-time throughout constant movement and/or rotations of a steering wheel.

Figure 3:
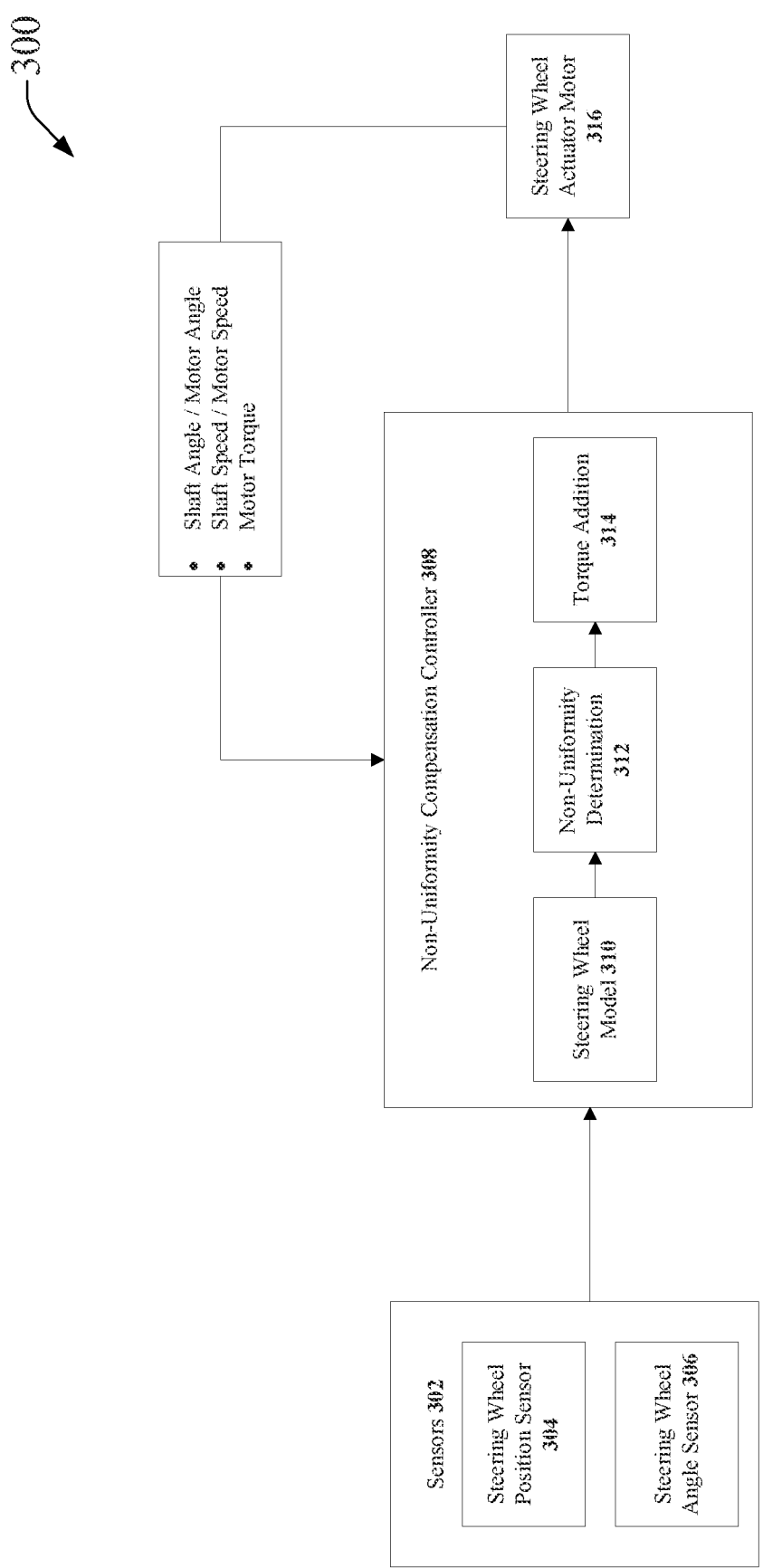
FIG. 3 illustrates a block diagram of an exemplary system in accordance with one or more embodiments described herein.

Turning now to FIG. 3, there is illustrated an example, non-limiting system 300 in accordance with one or more embodiments herein. According to an embodiment, system 300 can be utilized with steer by wire steering (e.g., using a steering wheel (e.g., comprising a steering wheel actuator motor and communicatively coupled steering box). It is noted that the steering wheel actuator motor can be received in the steering wheel in order to provide steering feedback and/or torque via the steering wheel. In steer by wire, non-uniformity can be caused by a center of gravity of a steering wheel. It is noted that system 300 can be similar to system 102 and/or system 200. System 300 can comprise one or more of sensors 302 (e.g., steering wheel position sensor 304 and/or steering wheel angle sensor 306), a non-uniformity compensation controller 308, and/or a steering wheel actuator motor 316. It is noted that the non-uniformity compensation controller 308 can receive data from the sensors 302 and/or the steering wheel actuator motor 316. For example, the non-uniformity compensation controller 308 can receive steering wheel position data from the steering wheel position sensor 304 and steering wheel angle data from the steering wheel angle sensor 306. The non-uniformity compensation controller 308 can additionally/alternatively receive steering shaft angle data or motor angle data, steering shaft speed data or motor speed data, and/or motor torque data from the steering wheel actuator motor 316. In this regard, the non-uniformity compensation controller 308 can utilize a steering wheel model 310 to generate a non-uniformity determination 312. Based on the non-uniformity determination 312, the non-uniformity compensation controller 308 can determine a torque addition 314 to apply to the steering wheel actuator motor 316. It is noted that in system 300, non-uniformity compensation is solely applied via the steering wheel actuator motor 316 (e.g., to compensate for the center of gravity of an associated steering wheel). To compensate for the non-uniformity, the non-uniformity compensation controller 308 can generate a steering wheel model 310 (e.g., using machine learning). In an embodiment, the steering wheel model 310 (e.g., generated using machine learning herein) can account for steering wheel tilt, steering wheel extension/retraction (e.g., position), steering wheel rotational position, etc. It is noted that the steering wheel model 310 can be tuned for each steering wheel (e.g., to account for variance between vehicle models or even manufacturing discrepancies between the same steering wheels. Further, the steering wheel model 310 (or steering wheel model 210) can account for steeling wheel center of mass discrepancies due to user customizations (e.g., replacement steering wheels or steering wheel accessories, such as steering wheel covers). It is further noted that the non-uniformity compensation controller 308 can rapidly determine torque additions 314 so that steering uniformity is maintained in real-time throughout constant movement and/or rotations of a steering wheel. In this regard, the non-uniformity compensation controller 308 can cause the steering wheel actuator motor 316 to compensate for the determined non-uniformity at the given position and angle (e.g., by an appropriate amount of torque applied via the steering wheel actuator motor 316).

Figure 4:
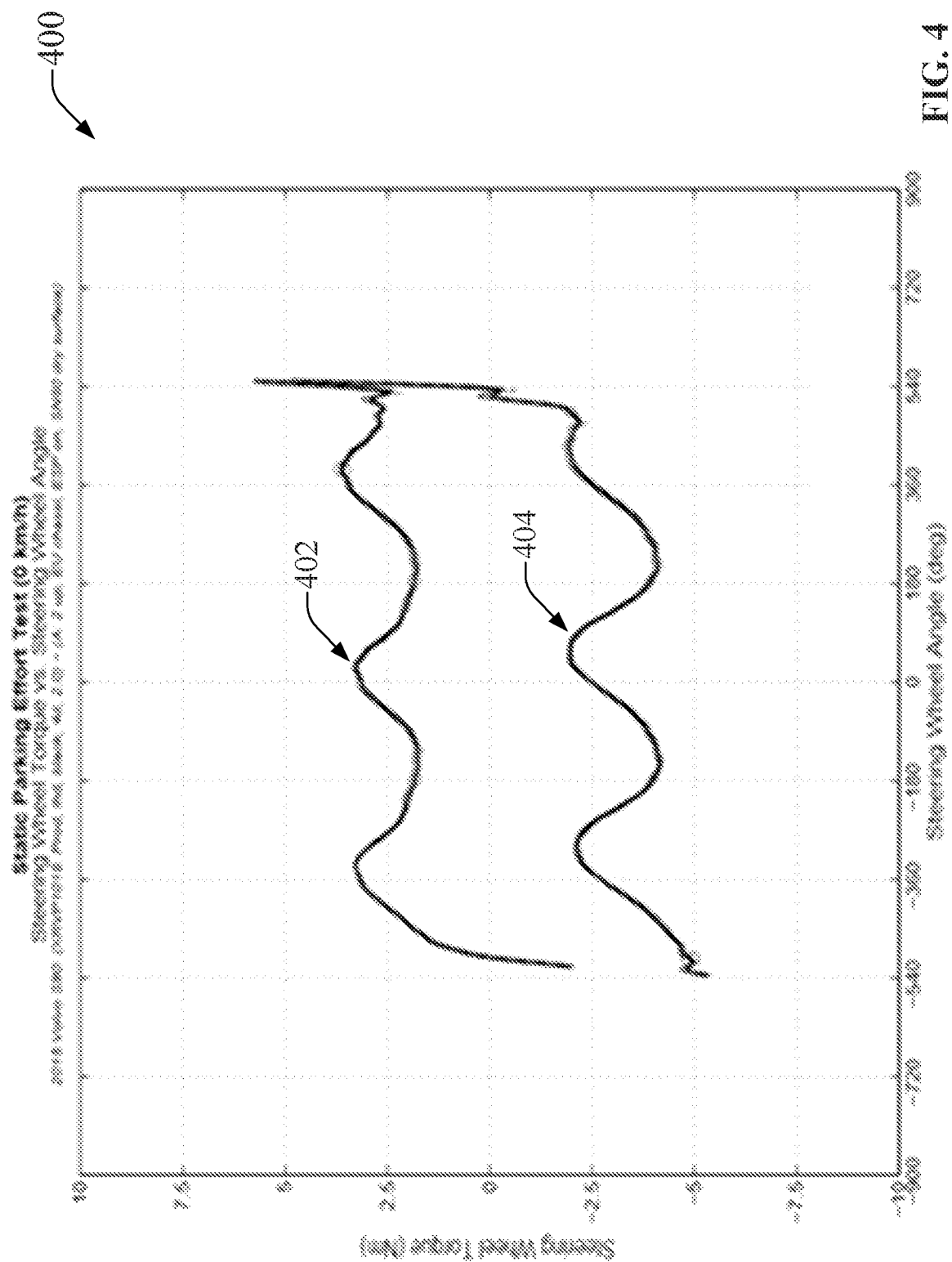
FIG. 4 is a graph of exemplary steering torque non-uniformity in accordance with one or more embodiments described herein.
Figure 5:
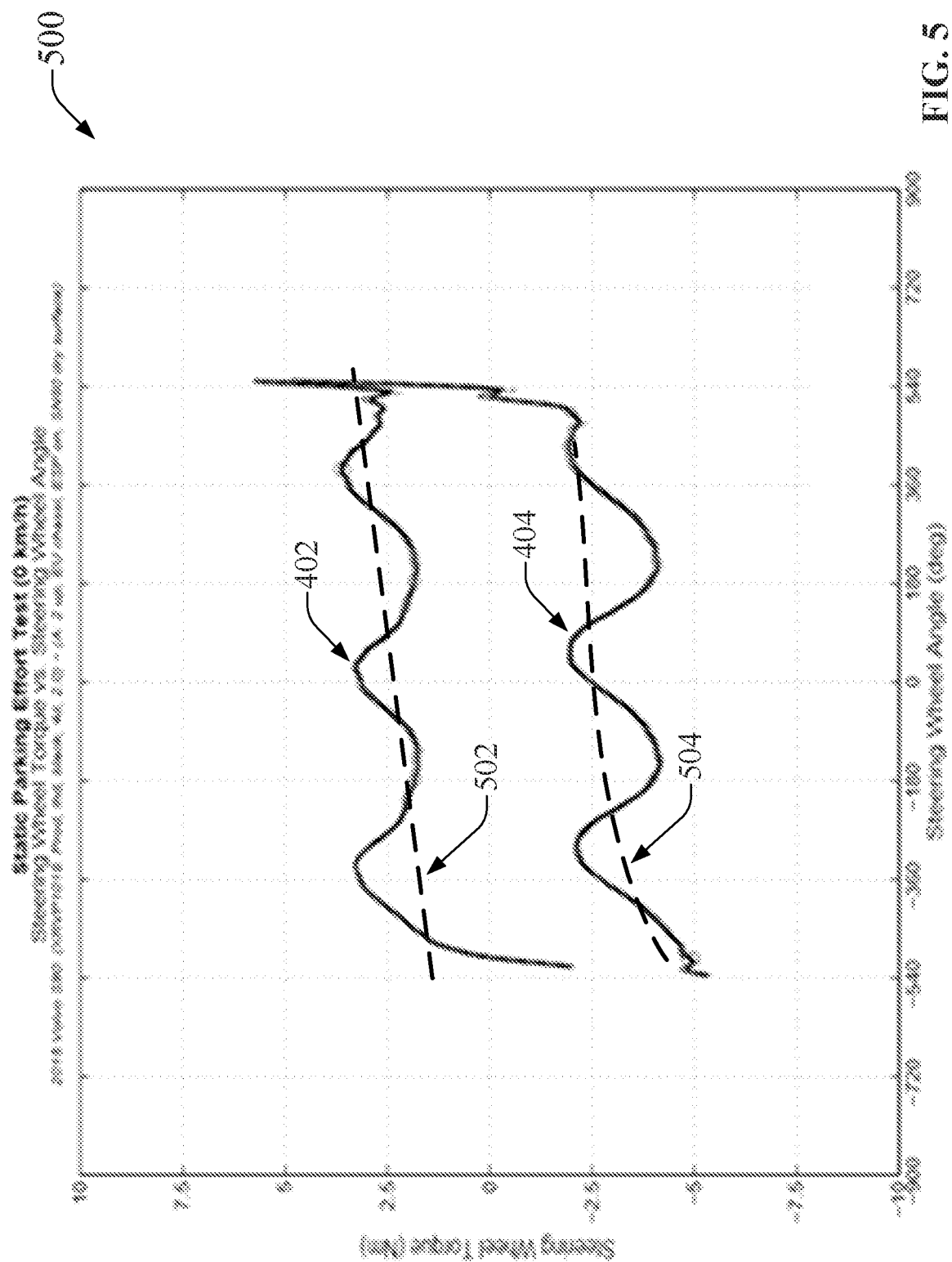
FIG. 5 is a graph of exemplary steering torque non-uniformity and associated compensation in accordance with one or more embodiments described herein.

FIG. 4 illustrates an example, non-limiting graph 400 in accordance with one or more embodiments described herein. Graph 400 illustrates non-uniformity line 402 and non-uniformity line 404. Such non-uniformities are observed in steering wheel torque vs steering wheel angle. The variations in torque observed in non-uniformity line 402 and non-uniformity line 404 can result in an inconsistent, non-linear steering wheel at an associated steering wheel. FIG. 5 illustrates an example, non-limiting graph 500 in accordance with one or more embodiments described herein. In this regard, graph 500 illustrates target line 502 and target line 504. The target lines 502 and 504 can represent a smoothed slope (e.g., a straight line or a smoother curve) of steering wheel torque vs. steering wheel angle. In this regard, a system 102, system, 200, and/or system 300 can be configured to compensate for the steering wheel torque non-uniformities in order to generate a consistent, linear steering feel. For example, the system 102, system 200, and/or system 300 can generate a steering non-uniformity model and determine a torque to apply to a steering wheel (or another suitable component described herein) in order to offset the uniformity (e.g., to counteract the deviation of the non-uniformity line 402 or non-uniformity line 404 from a respective target line).

Figure 6:
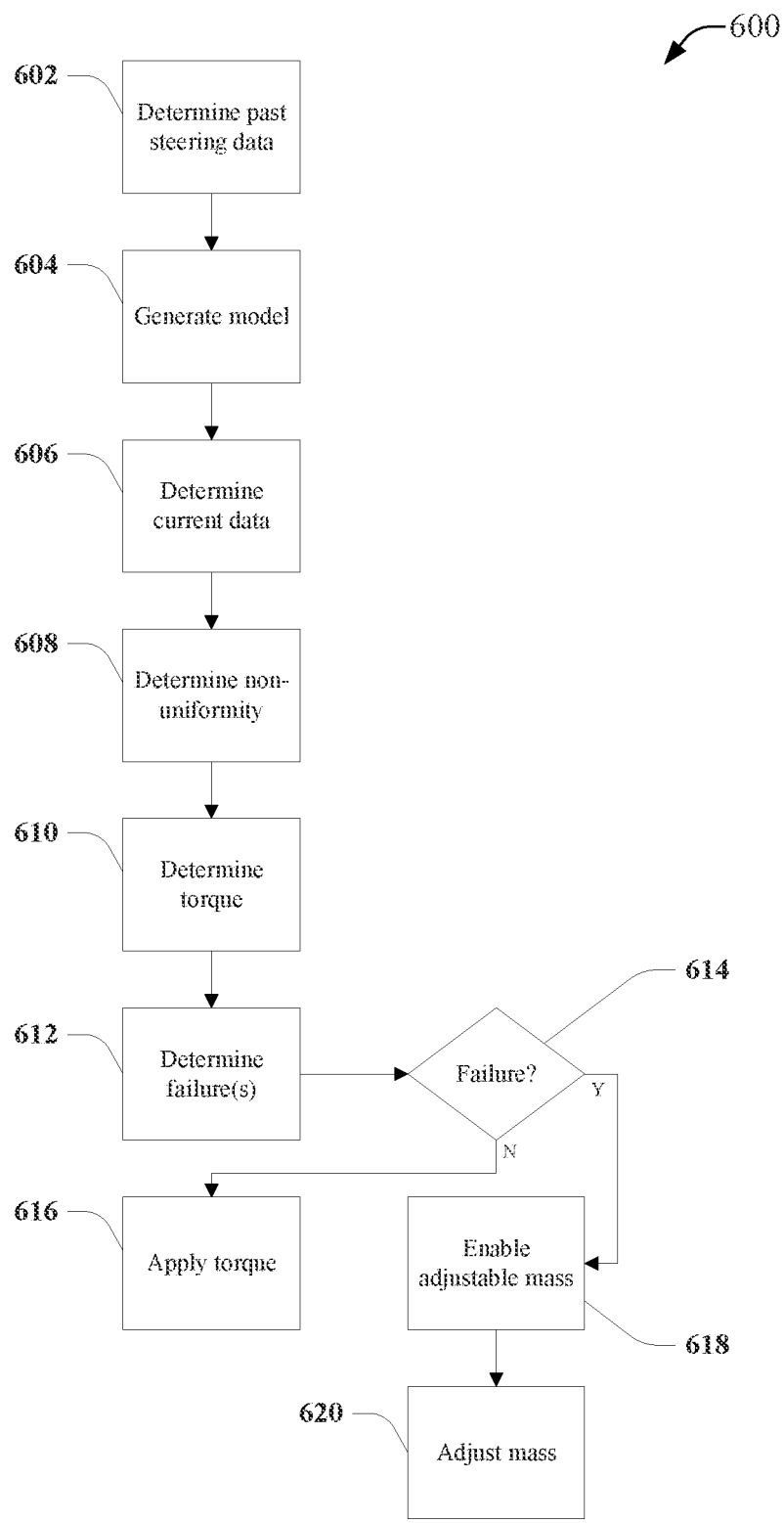
FIG. 6 is an exemplary flowchart of a process associated with steering torque non-uniformity compensation in accordance with one or more embodiments described herein.

Turning now to FIG. 6, there is illustrated a flowchart of a process 600 relating to steering torque non-uniformity compensation in accordance with one or more embodiments described herein. At 602 past steering data can be determined (e.g., using an M.L. component 110). At 604, the M.L. component 110 can generate a steering non-uniformity model (e.g., a steering wheel model and/or a steering column model generated using machine learning herein applied to past steering data herein). At 606, the M.L. component 110 can determine current steering data (e.g., current position, current angle, current speeds, current torques) (e.g., using one or more sensor 114). At 608, the M.L. component 110 can determine a non-uniformity at the steering wheel, steering column, steering rack, or steering box based on the current steering data. At 610, the torque compensation component 112 can, based on the current steering data and the non-uniformity model, determine a torque to apply to the steering wheel (or another suitable component herein) configured to offset a steering non-uniformity at the current position/angle. At 612, any failures in the steering system can be determined and/or identified. At 614, if a failure (e.g., a failure that could interfere with steering torque compensation herein) does not exist, the determined torque can be applied at 616. If such a failure does exist, the determined torque would not be applied. Instead, an alternate compensation mechanism can be enabled. In this regard, an adjustable mass can be enabled at 618. For example, the adjustable mass can be enabled in response to an EPAS motor or sensor failure, drive by wire wheel actuator motor failure, electro-hydraulic motor or sensor failure, or another suitable failure. At 620, the adjustable mass can be adjusted (e.g., based on the non-uniformity).

Figure 7:
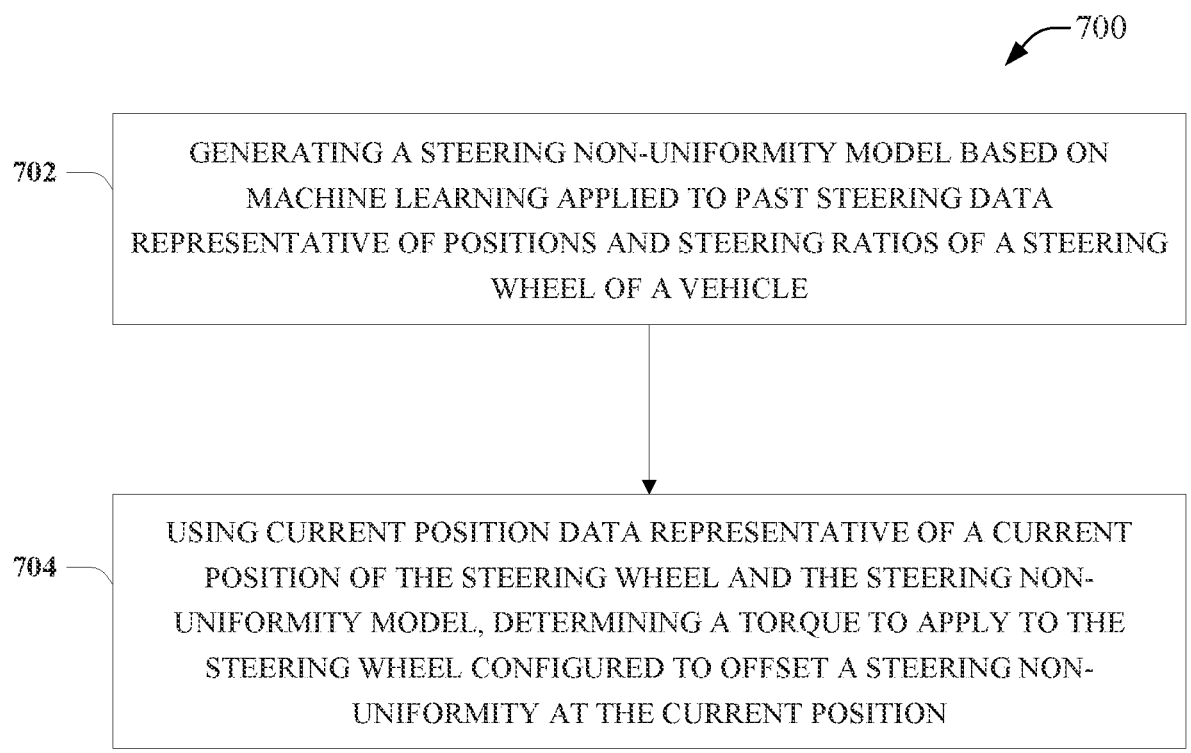
FIG. 7 illustrates a block flow diagram for a process associated with steering torque non-uniformity compensation in accordance with one or more embodiments described herein.

FIG. 7 illustrates a block flow diagram for a process 700 associated with steering torque non-uniformity compensation in accordance with one or more embodiments described herein. At 702, the process 700 can comprise generating a steering non-uniformity model based on machine learning applied to past steering data representative of positions and steering ratios of a steering wheel of a vehicle. At 704, the process 700 can comprise using current position data representative of a current position of the steering wheel and the steering non-uniformity model, determining a torque to apply to the steering wheel configured to offset a steering non-uniformity at the current position.

Figure 8:
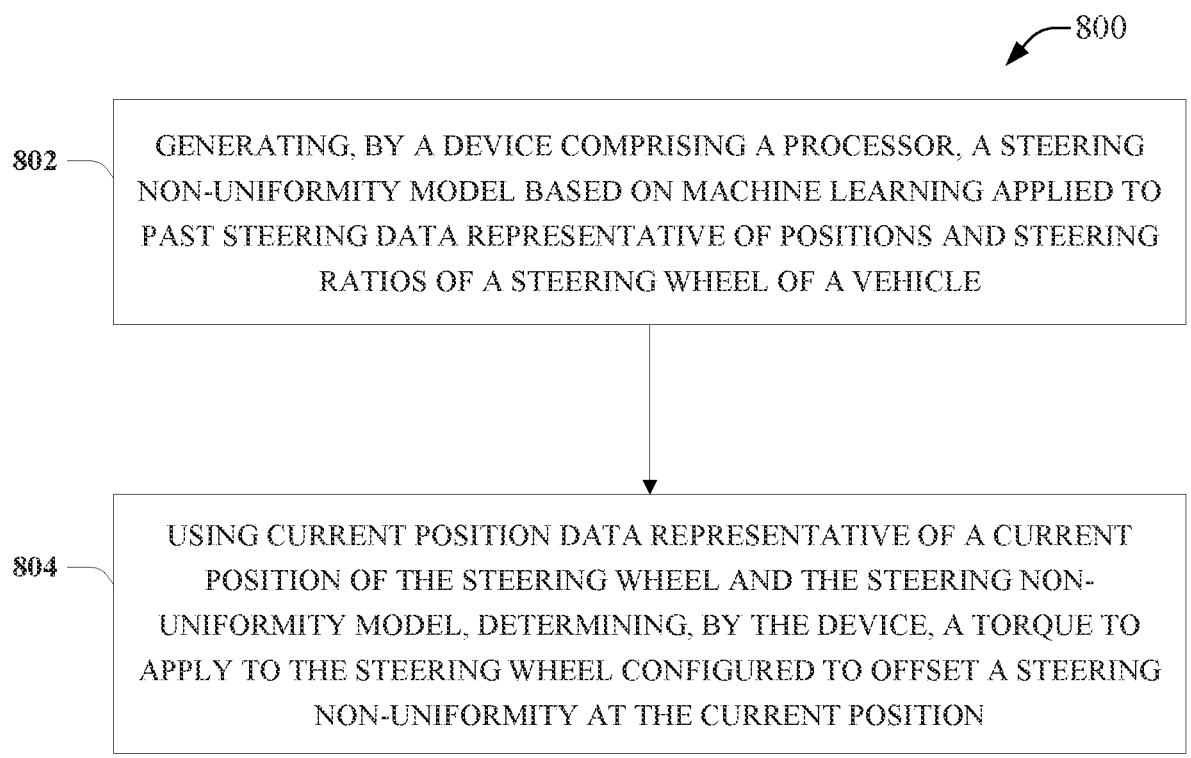
FIG. 8 illustrates a block flow diagram for a process associated with steering torque non-uniformity compensation in accordance with one or more embodiments described herein.

FIG. 8 illustrates a block flow diagram for a process 800 associated with steering torque non-uniformity compensation in accordance with one or more embodiments described herein. At 802, the process 800 can comprise generating, by a device comprising a processor, a steering non-uniformity model based on machine learning applied to past steering data representative of positions and steering ratios of a steering wheel of a vehicle. At 802, the process 800 can comprise using current position data representative of a current position of the steering wheel and the steering non-uniformity model, determining, by the device, a torque to apply to the steering wheel configured to offset a steering non-uniformity at the current position Systems described herein can be coupled (e.g., communicatively, electrically, operatively, optically, etc.) to one or more local or remote (e.g., external) systems, sources, and/or devices (e.g., electronic control systems (ECU), classical and/or quantum computing devices, communication devices, etc.). For example, system 102 (or other systems, controllers, processors, etc.) can be coupled (e.g., communicatively, electrically, operatively, optically, etc.) to one or more local or remote (e.g., external) systems, sources, and/or devices using a data cable (e.g., High-Definition Multimedia Interface (HDMI), recommended standard (RS), Ethernet cable, etc.) and/or one or more wired networks described below.

In some embodiments, systems herein can be coupled (e.g., communicatively, electrically, operatively, optically, etc.) to one or more local or remote (e.g., external) systems, sources, and/or devices (e.g., electronic control units (ECU), classical and/or quantum computing devices, communication devices, etc.) via a network. In these embodiments, such a network can comprise one or more wired and/or wireless networks, including, but not limited to, a cellular network, a wide area network (WAN) (e.g., the Internet), and/or a local area network (LAN). For example, system 102 can communicate with one or more local or remote (e.g., external) systems, sources, and/or devices, for instance, computing devices using such a network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In this example, system 102 can thus include hardware (e.g., a central processing unit (CPU), a transceiver, a decoder, an antenna (e.g., a ultra-wideband (UWB) antenna, a BLUETOOTH® low energy (BLE) antenna, etc.), quantum hardware, a quantum processor, etc.), software (e.g., a set of threads, a set of processes, software in execution, quantum pulse schedule, quantum circuit, quantum gates, etc.), or a combination of hardware and software that facilitates communicating information between a system herein and remote (e.g., external) systems, sources, and/or devices (e.g., computing and/or communication devices such as, for instance, a smart phone, a smart watch, wireless earbuds, etc.).

System herein can comprise one or more computer and/or machine readable, writable, and/or executable components and/or instructions that, when executed by processor (e.g., a processor 106 which can comprise a classical processor, a quantum processor, etc.), can facilitate performance of operations defined by such component(s) and/or instruction(s). Further, in numerous embodiments, any component associated with a system herein, as described herein with or without reference to the various figures of the subject disclosure, can comprise one or more computer and/or machine readable, writable, and/or executable components and/or instructions that, when executed by a processor, can facilitate performance of operations defined by such component(s) and/or instruction(s). Consequently, according to numerous embodiments, system herein and/or any components associated therewith as disclosed herein, can employ a processor (e.g., processor 106) to execute such computer and/or machine readable, writable, and/or executable component(s) and/or instruction(s) to facilitate performance of one or more operations described herein with reference to system herein and/or any such components associated therewith.

Systems herein can comprise any type of system, device, machine, apparatus, component, and/or instrument that comprises a processor and/or that can communicate with one or more local or remote electronic systems and/or one or more local or remote devices via a wired and/or wireless network. All such embodiments are envisioned. For example, a system (e.g., a system 302 or any other system or device described herein) can comprise a computing device, a general-purpose computer, a special-purpose computer, an onboard computing device, a communication device, an onboard communication device, a server device, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Figure 9:
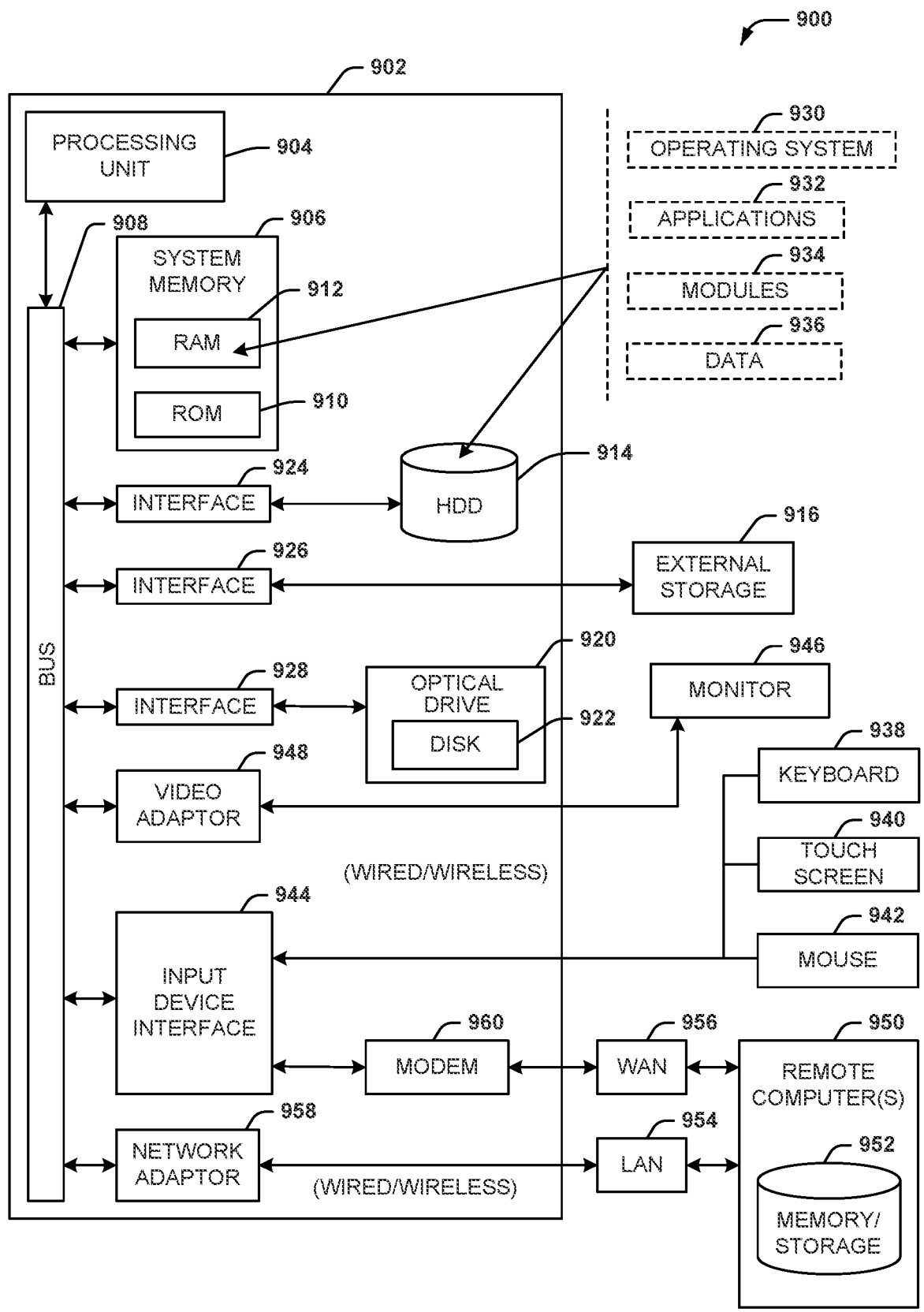
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
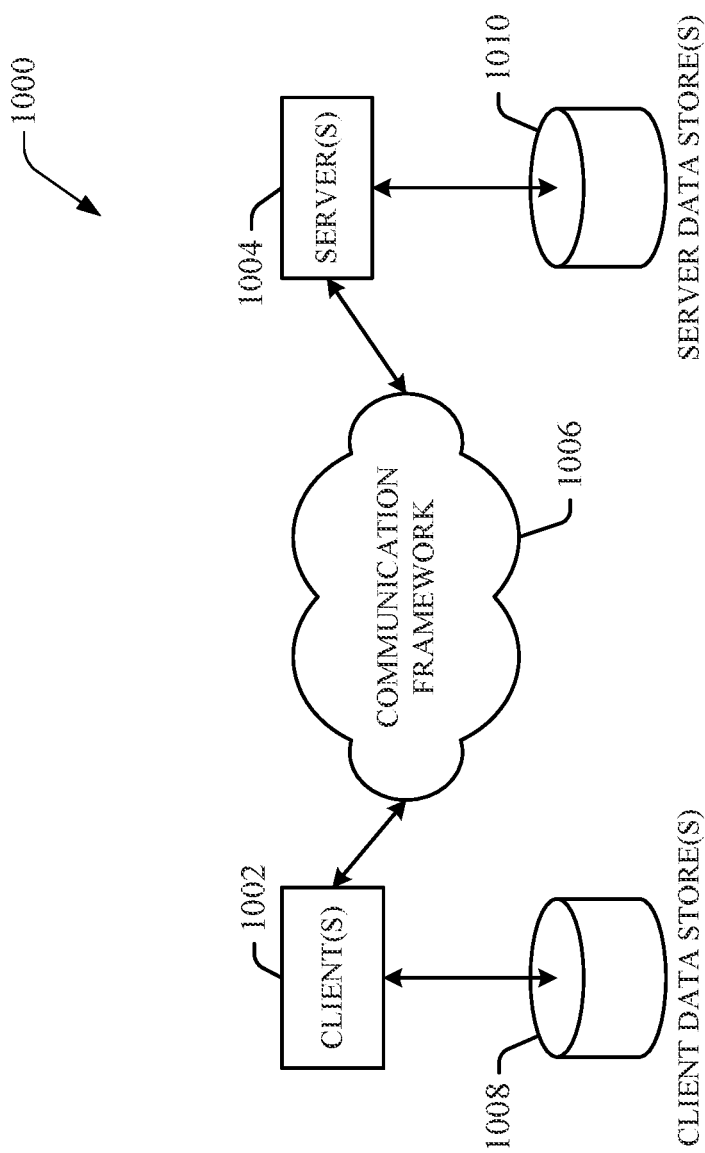
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed file to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. A system, comprising:
   a memory that stores computer executable components; and
   a processor that executes the computer executable components stored in the memory, wherein the computer executable components comprise:
   a machine learning component that generates a steering non-uniformity model based on machine learning applied to past steering data representative of positions and steering ratios of a steering wheel of a vehicle; and
   a torque compensation component that, using current position data representative of a current position of the steering wheel and the steering non-uniformity model, determines a torque to apply to the steering wheel configured to offset a steering non-uniformity at the current position.
2. The system of any preceding clause, wherein the vehicle comprises electronic power assisted steering, and wherein the torque is applied via an electric motor of the electronic power assisted steering.
3. The system of any preceding clause, wherein the vehicle comprises drive by wire steering.
4. The system of any preceding clause, wherein the torque is applied via an electric feedback motor of the steering wheel.
5. The system of any preceding clause, further comprising an adjustable mass received in the steering wheel, wherein the adjustable mass is configured to alter a center of mass of the steering wheel.
6. The system of any preceding clause, further comprising:
an actuator that, based on the torque, moves the adjustable mass to adjust a moment of inertia of the steering wheel.
7. The system of any preceding clause, further comprising:
a position sensor that determines the positions and steering ratios of a steering wheel of the vehicle.
8. The system of any preceding clause, wherein the steering non-uniformity model is configured to model a relationship between steering angles of the vehicle and respective steering torques exhibited at the steering wheel.
9. The system of any preceding clause, wherein the steering wheel comprises an adjustable steering wheel, and wherein the past steering column data is further representative of past adjusted positions of the steering wheel.
10. The system of any preceding clause, wherein the vehicle comprises electrohydraulic power assisted steering, and wherein the torque is applied via an actuator of the electrohydraulic power assisted steering.
11. The system of clause 1 above with any set of combinations of the systems 2-10 above.
12. A non-transitory machine-readable medium, comprising executable instructions that, when executed by a processor, facilitate performance of operations, comprising:
generating a steering non-uniformity model based on machine learning applied to past steering data representative of positions and steering ratios of a steering wheel of a vehicle; and
using current position data representative of a current position of the steering wheel and the steering non-uniformity model, determining a torque to apply to the steering wheel configured to offset a steering non-uniformity at the current position.
13. The non-transitory machine-readable medium of any preceding clause, wherein the steering wheel comprises an adjustable steering wheel, and wherein the past steering column data is further representative of past adjusted positions of the steering wheel.
14. The non-transitory machine-readable medium of any preceding clause, wherein the vehicle comprises a drive by wire steering system.
15. The non-transitory machine-readable medium of any preceding clause, wherein the torque from the drive by wire steering system is applied via an electric feedback motor of the steering wheel.
16. The non-transitory machine-readable medium of any preceding clause, wherein the operations further comprise:
in response to determining a failure associated with a component of the drive by wire steering system, generating an adjustment signal configured to adjust an adjustable mass received in the steering wheel via an actuator that, based on the torque, moves the adjustable mass to adjust a moment of inertia of the steering wheel, wherein the adjustable mass is configured to alter a center of mass of the steering wheel.
17. The non-transitory machine-readable medium of any preceding clause, wherein the adjustable mass biases the center of mass of the steering wheel to return the steering wheel to a centered position.
18. The non-transitory machine-readable medium of any preceding clause, wherein the torque to apply is further based on setting information representative of a driving mode setting received via a user interface of the vehicle.
19. The non-transitory machine-readable medium of clause 12 above with any set of combinations of the non-transitory machine-readable mediums 13-18 above.
20. A method, comprising:
generating, by a device comprising a processor, a steering non-uniformity model based on machine learning applied to past steering data representative of positions and steering ratios of a steering wheel of a vehicle; and
using current position data representative of a current position of the steering wheel and the steering non-uniformity model, determining, by the device, a torque to apply to the steering wheel configured to offset a steering non-uniformity at the current position.
21. The method of any preceding clause, wherein the vehicle comprises electronic power assisted steering, and wherein the torque is applied via an electric motor of the electronic power assisted steering.
22. The method of any preceding clause, wherein the vehicle comprises electrohydraulic power assisted steering, and wherein the torque is applied via an actuator of the electrohydraulic power assisted steering.
23. The method of clause 20 above with any set of combinations of the methods of clauses 21-22 above.

What is claimed is:

1. A system, comprising:
a memory that stores computer executable components; and
a processor that executes the computer executable components stored in the memory, wherein the computer executable components comprise:
a machine learning component that generates a steering non-uniformity model based on machine learning applied to past steering data representative of positions and steering ratios of a steering wheel of a vehicle;
a torque compensation component that, using current position data representative of a current position of the steering wheel and the steering non-uniformity model, determines a torque to apply to the steering wheel configured to offset a steering non-uniformity at the current position, wherein the steering wheel comprises an adjustable mass that is configurable to alter a center of mass of the steering wheel; and an actuator that, based on the torque, moves the adjustable mass to adjust the center of mass of the steering wheel to correspond to a center axis of the steering wheel.

2. The system of claim 1, wherein the vehicle comprises electronic power assisted steering, and wherein the torque is applied via an electric motor of the electronic power assisted steering.

3. The system of claim 1, wherein the vehicle comprises drive by wire steering.

4. The system of claim 1, wherein the torque is applied via an electric feedback motor of the steering wheel.

5. The system of claim 1, further comprising:
a position sensor that determines the positions and the steering ratios of the steering wheel of the vehicle.

6. The system of claim 1, wherein the steering non-uniformity model is configured to model a relationship between steering angles of the vehicle and respective steering torques exhibited at the steering wheel.

7. The system of claim 1, wherein the steering wheel comprises an adjustable steering wheel, and wherein the past steering column data is further representative of past adjusted positions of the steering wheel.

8. The system of claim 1, wherein the actuator is first actuator, and the vehicle comprises electrohydraulic power assisted steering, and wherein the torque is applied via a second actuator of the electrohydraulic power assisted steering.

9. A non-transitory machine-readable medium, comprising executable instructions that, when executed by a processor, facilitate performance of operations, comprising:
generating a steering non-uniformity model based on machine learning applied to past steering data representative of positions and steering ratios of a steering wheel of a vehicle;
using current position data representative of a current position of the steering wheel and the steering non-uniformity model, determining a torque to apply to the steering wheel configured to offset a steering non-uniformity at the current position, wherein the steering wheel comprises an adjustable mass that is configurable to alter a center of mass of the steering wheel; and
based on the torque, moving the adjustable mass to adjust the center of mass of the steering wheel to correspond to a center axis of the steering wheel.

10. The non-transitory machine-readable medium of claim 9, wherein the steering wheel comprises an adjustable steering wheel, and wherein the past steering column data is further representative of past adjusted positions of the steering wheel.

11. The non-transitory machine-readable medium of claim 9, wherein the vehicle comprises a drive by wire steering system.

12. The non-transitory machine-readable medium of claim 11, wherein the torque from the drive by wire steering system is applied via an electric feedback motor of the steering wheel.

13. The non-transitory machine-readable medium of claim 9, wherein the torque to apply is further based on setting information representative of a driving mode setting received via a user interface of the vehicle.

14. A method, comprising:
generating, by a device comprising a processor, a steering non-uniformity model based on machine learning applied to past steering data representative of positions and steering ratios of a steering wheel of a vehicle;
using current position data representative of a current position of the steering wheel and the steering non-uniformity model, determining, by the device, a torque to apply to the steering wheel configured to offset a steering non-uniformity at the current position, wherein the steering wheel comprises an adjustable mass that is configurable to alter a center of mass of the steering wheel; and
based on the torque, moving, by the device, the adjustable mass to adjust the center of mass of the steering wheel to correspond to a center axis of the steering wheel.

15. The method of claim 14, wherein the vehicle comprises electronic power assisted steering, and wherein the torque is applied via an electric motor of the electronic power assisted steering.

16. The method of claim 15, wherein the vehicle comprises electrohydraulic power assisted steering, and wherein the torque is applied via an actuator of the electrohydraulic power assisted steering.

17. The method of claim 14, further comprising:
monitoring, by the device, via a position sensor, the positions and the steering ratios of the steering wheel of the vehicle.

18. The method of claim 14, wherein the steering wheel comprises an adjustable telescoping steering wheel, and wherein the past steering data is further representative of past adjusted telescoping positions of the steering wheel.

19. The non-transitory machine-readable medium of claim 9, wherein the operations further comprise:
monitor, via a position sensor, the positions and the steering ratios of the steering wheel of the vehicle.

20. The system of claim 1, wherein the torque compensation component determines the torque further based on a user selected driving mode from a group of driving modes respectively corresponding to different steering modes.

* * * * *